Sept. 12, 1961 W. RAST 2,999,529
EXPANDING TOOL FOR PIPES
Filed Nov. 12, 1958
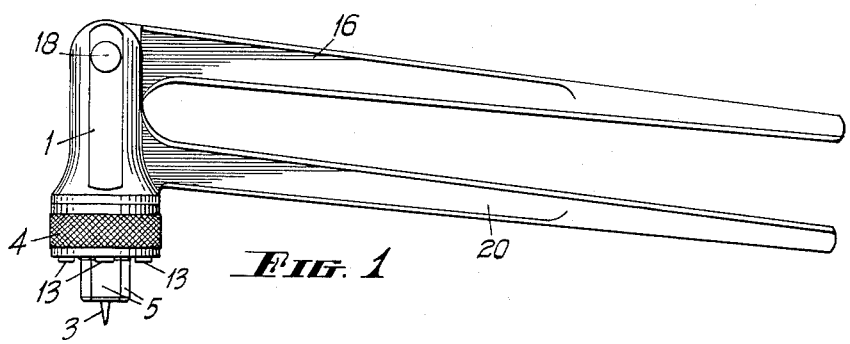
Fig. 1
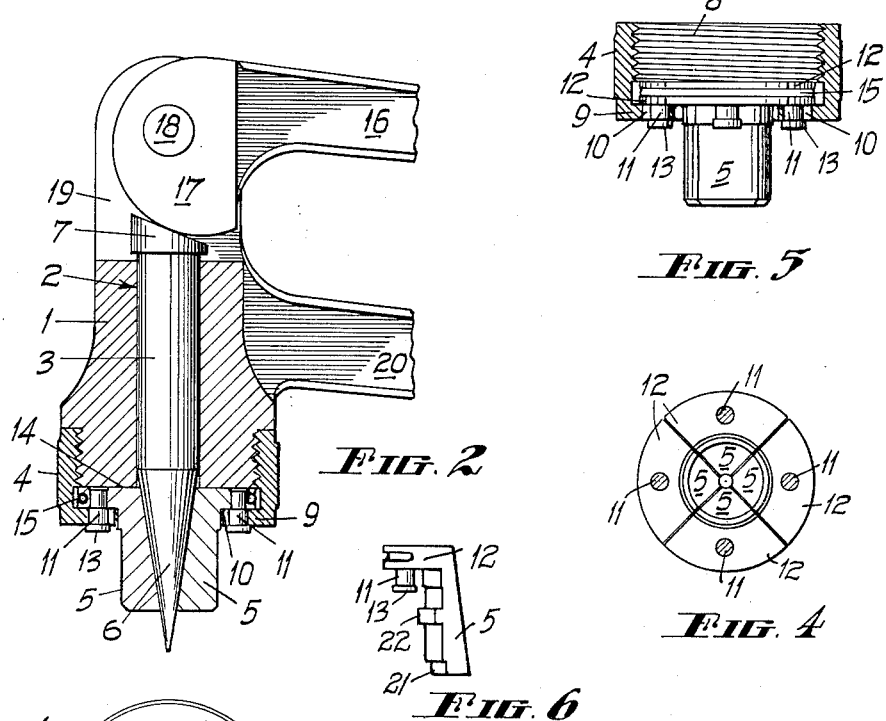
Fig. 2
Fig. 5
Fig. 6
Fig. 4
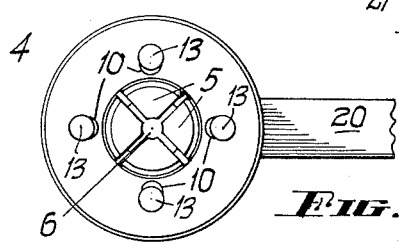
Fig. 3

United States Patent Office 2,999,529
Patented Sept. 12, 1961

2,999,529
EXPANDING TOOL FOR PIPES
Wlodzimierz Rast, 46 Kanbara St., Flinders Park,
South Australia, Australia
Filed Nov. 12, 1958, Ser. No. 773,389
Claims priority, application Australia Nov. 13, 1957
1 Claim. (Cl. 153—80)

This invention relates to an expanding tool for pipes and in particular it relates to a tool which can be used to expand the ends of pipes, particularly copper or other soft walled types, prior to joining by silver soldering or brazing or the like.

When joining pipes for refrigeration purposes it is customary to expand the end of one pipe for a short distance and to fit the other pipe into same without expanding it so that one pipe then has a socket which engages the tail of the other pipe with a relatively neat fit to allow silver solder or the like to be run into the joint to make a joint which is both mechanically strong and hermetically sealed.

A considerable difficulty exists however in being able to expand the tubes to the correct diameter and accuracy.

It is the object of this invention to provide an improved expander which will achieve the accuracy and ease of expansion and this is achieved by providing a series of jaws adapted to be inserted in a tube, a main body, means to confine the jaws axially but not radially in relation to the body, a tapered shaft carried by the body to expand the jaws, and means to move the tapered shaft.

A series of jaws may be provided, arranged in sets, to allow one tool to be used for expanding a number of different sizes of pipes, the member which is engageable on the block carrying the said sets of jaws.

To enable the invention to be fully understood, an embodiment will now be described with reference to the accompanying drawings in which:

FIG. 1 is a side elevation of such a tool,

FIG. 2 is an enlarged sectional view of the head with the jaws in expanded position, FIG. 3 is a view of FIG. 2 from the jaw end, FIG. 4 is a view corresponding to FIG. 3 but showing the jaws only, the jaws being in their retracted position, FIG. 5 is a central section of the holding member with the jaws therein but unsectioned, the jaws again being in their retracted position, and FIG. 6 is a section of one jaw showing a modified contour.

A body 1 has through it a hollow 2 in which a tapered shaft 3 is slidably disposed, the end of the body 1 having on it a threaded holding member 4 which carries the plurality of jaws 5 so that they are slidable inwardly and outwardly within the member 4 to be capable of expansion and contraction in overall diameter.

The tapered shaft 3 has a tapered section 6 at one end an expanded part 7 at the other. The holding member 4 has a screw thread 8 within it which engages a complementary thread on the body 1 so that the holding member 4 can be readily replaced.

On the outer end of the holding member is an inwardly disposed flange 9 in which are a series of elongated holes 10 through which pins 11, which are secured in flanges 12 on the jaws 5, are disposed so that the jaws 5 are held by the holding member 4 through the pins 11 but can move outward and inward thereon to allow expansion and contraction. The pins 11 have heads 13 to prevent withdrawal of the jaws 5 from their associated holding member 4.

In use the jaws 5 are confined against axial movement with the tapered shaft 3 by having the flanges 12 on the jaws disposed between the flange 9 on the holding member 4 and the face 14 on the end of the body 1.

Each assembly of jaws 5 is internally shaped with a taper corresponding to the tapered portion 6 of the shaft 3 to force the jaws outwards with a parallel motion.

A series of holding members 4, each with a different set of jaws, can be provided, the jaws being then arranged with different amounts of movement or different dimensions to allow a selection of the expansion of the tubes as well as the size of the tubes which can be expanded.

A circlet 15 is a groove around the periphery of the flanges 12 of the jaws 5 will normally urge the jaws into their contracted position.

The tapered shaft 3 is moved down into its expanding position by means of a handle 16 having on it a cam 17 which engages the part 7 of the drift, the handle 16 being carried on a hinge pin 18 carried in the body 1, the body having an open slot 19 to accommodate the cam 17.

The body 1 itself is provided with a complementary handle 20 to allow the tool to be manipulated. Spring return means are not shown for the pivoted handle 16 or the tapered shaft 3 but can be provided if required, or the tapered shaft can be operated by any other pressure means or by hammering or the like if this is thought desirable.

Instead of using a screwed member 4 to carry the jaws, a member otherwise engageable on the front of the body may be used, and if desired this could be arranged to take various sets of jaws so that only the jaws need be interchangeable for different size tubes and different degrees of expansion.

In use it is simply necessary to position the jaws 4 in their contracted position in a tube which is to be expanded and to then operate the handles 16 and 20 to force the jaws outwardly, the operation being repeated after the jaws have been turned slightly in the tube if that is required but normally it will be sufficient to simply place the tool against the end of the tube with the jaws engaged therein and to operate the lever or the like which will move the tapered shaft 3 forwardly and will then expand the jaws 5 and consequently the tube by the exact amount required.

When effecting a joint with this tube it is then only necessary to place the tail of one tube into the expanded socket formed on the other tube and to heat the joint and at the same time allowing silver solder or other joining compound to draw into the joint by capillary action, or the tubes can be fitted together in this way and brazed or otherwise permanently jointed.

In the embodiment shown in FIG. 6 a peripheral recess 21 is shown at the end of the jaw 5, and a peripheral ring 22 intermediate the length of the jaw.

The purpose of the recess 21 is to allow deburring of a tube by first forcing the burred metal outwards after which the end of the tube can be engaged on the jaws and the end expanded as before.

The purpose of the peripheral ring 22 is to allow a tube to have a ridge expanded on it for use as a nut and tail or similar coupling the outer diameter of the ridge fitting into the tube prior to expansion of the jaws.

It will be obvious that the invention applies anywhere where tubes need to be joined and it provides an effective tube joint for refrigeration or hot water services or the like, particularly where tubes of relatively ductile metal such as copper are to be joined.

What is claimed is:

An improved tube expander comprising a series of jaws, an outward flange on each jaw, a pin on each said flange, a main body having a hollow therein, a holding member engageable on one end of the said body having an inward flange and elongated apertures in said flange engaged by said pins whereby the said jaws are confined on said holding member but may be expanded or contracted thereon, a circlet urging said jaws into contracted position, said flanges on said jaws being confined between the said inward flange on said holding member and a face on said body to prevent axial movement of said jaws, a tapered shaft axially movable in the hollow of said body to expand or contract said jaws, a handle on said body projecting substantially at right angles thereto, a second handle pivoted to said body and extending adjacent the first said handle, and a cam on said second handle to engage and move said tapered shaft.

References Cited in the file of this patent

UNITED STATES PATENTS

| | | |
|---|---|---|
| 691,446 | Colby | Jan. 21, 1902 |
| 878,457 | Deller | Feb. 4, 1908 |
| 1,671,137 | Teisinger | May 29, 1928 |
| 2,320,435 | Hood | June 1, 1943 |
| 2,360,054 | Haas | Oct. 10, 1944 |

FOREIGN PATENTS

| | | |
|---|---|---|
| 706,615 | Germany | May 30, 1941 |